United States Patent [19]

Spanswick

[11] 4,302,382
[45] Nov. 24, 1981

[54] COLOR STABLE AROMATIC POLYESTERS

[75] Inventor: James Spanswick, Wheaton, Ill.

[73] Assignee: Standard Oil Company (Indiana), Chicago, Ill.

[21] Appl. No.: 146,741

[22] Filed: May 5, 1980

[51] Int. Cl.$^3$ .......................... C08K 5/15; C08K 5/52; C08K 5/53

[52] U.S. Cl. ........................... 260/45.8 A; 260/45.7 P; 260/45.95 D; 528/176

[58] Field of Search .................. 260/45.7 P, 45.7 PT, 260/45.8 AH, 45.95 D; 528/176

[56] References Cited

U.S. PATENT DOCUMENTS

| | | | |
|---|---|---|---|
| 3,143,526 | 8/1964 | Caldwell et al. | 528/176 |
| 3,210,318 | 10/1965 | Dolce et al. | 260/45.8 AH |
| 3,216,970 | 11/1965 | Conix | 528/176 |
| 3,234,167 | 2/1966 | Sweeny | 528/176 |
| 3,676,393 | 7/1972 | Piirma | 260/45.7 PT |
| 3,886,104 | 5/1975 | Borman et al. | 260/45.8 AH |
| 4,008,199 | 2/1977 | Gall | 260/45.95 D |
| 4,077,940 | 3/1978 | Wedel | 260/45.7 P |

*Primary Examiner*—John Kight, III
*Assistant Examiner*—R. A. White
*Attorney, Agent, or Firm*—Gunar J. Blumberg; William T. McClain; William H. Magidson

[57] ABSTRACT

Color stable compositions consisting of aromatic polyester and 0.01 to 0.5% by weight of the aromatic polyester of a stabilizer selected from the group consisting of phosphates, phosphonates and mixtures of either phosphates or phosphonates with epoxides having a boiling point of above about 250° C. These compositions are useful in the manufacture of engineering plastics such as automobile headlights.

10 Claims, No Drawings

COLOR STABLE AROMATIC POLYESTERS

BACKGROUND OF THE INVENTION

Field of the Invention

This invention relates to color stabilized polyarylates, more particularly it relates to color stabilized polyesters. In the art the term polyarylate has come to mean the ester interchange reaction products of phenol esters of nonvicinal benzene dicarboxylic acids and aromatic polyhydric alcohols such as bisphenol A, etc.

Colorless polyarylates form color on heating in the presence of oxygen. This is well known in the art and limits the use of these compounds. Example 2 specifically demonstrates this. A. David and J. H. Golden, in the European Polymer Journal, 1968, Vol. 4, 581, demonstrate that in aromatic aryl esters degradation proceeds via a free radical process. The result of this degradation is that the colorless transparent polymer degrades to a yellow to brownish color.

For molding applications it is imperative that the molded object be colorless and therefore color stabilized polyarylates are essential to give these compounds utility. This is particularly true for aromatic polyesters which are used as engineering plastics for automobile headlights and related applications where the product has to be colorless and transparent. In the past it has been difficult to achieve this since the molding operation itself places oxygen at elevated temperatures and pressures in contact with the polyarylate thus causing its degradation and color formation. It is well established that unstabilized polyarylates usually degrade during molding if they have not already degraded as shown in Table 1.

The prior art discloses some attempts to deal with this problem thus, in the Japanese Pat. No. 74 36,752 discloses that certain polyesters can be stabilized with phosphorus acid and triaryl or trialkyl phosphites. However, the concept that epoxides and phosphates or phosphonates can be utilized to color stabilized polyesters is unknown to the art.

The preparation of some of the polyarylates stabilized according to applicant's process are disclosed in U.S. Pat. No. 3,772,389 incorporated herein by reference. Thus, aryl phenolic compounds disclosed in the aforementioned U.S. Patent are useful provided that they contain at least one hydrogen atom on the benzene ring ortho to the hydroxyl moiety of the phenol compound. Suitable aromatic hydroxyl compounds include bisphenol A, hydroquinone, resorcinol, 4',4"-dihydroxy 1,1-diphenyl methane, 4',4"-dihydroxy 1,1-diphenyl ethane, 4',4"-dihydroxy 1,1-diphenyl butane, 4',4"-dihydroxy 1,1-diphenyl isobutane, 4',4"-dihydroxy 1,1-diphenyl propane, 4',4"-dihydroxy 2,2'-diphenyl butane, 4',4"-dihydroxy 2,2'-diphenyl pentane, 4',4"-dihydroxy 6,6'-diphenyl heptane, (4',4"-dihydroxy diphenyl)(phenyl)methyl methane, (4,4'-dihydroxy diphenyl)-diphenyl) methane, 4',4"-dihydroxy 1,1-diphenylcyclopentane, 4',4"-dihydroxy 1,1-diphenylcyclohexane, 4',4"-dihydroxy-3',3"-dichloro-2,2-diphenylpropane, 4',4"-dihydroxy-3',3", 5',5"-tetrachloro-2,2-diphenylpropane, 4',4"-dihydroxy-3',3",5',5"-tetrabromo-1,1-diphenylcyclohexane, 4',4"-dihydroxy-3',3"-dimethyl-2,2-diphenyl propane, 4,4'-dihydroxy diphenyl, 4,4'-dihydroxy diphenyl oxide, 4,4'-dihydroxy diphenyl sulphide, 4,4'-dihydroxy diphenyl sulphoxide, 4,4'-dihydroxy diphenyl sulphone, 2,2'-dihydroxy diphenyl, 4,4'-dihydroxy-2',2,6,6'-tetramethyl diphenyl, 4,4'-dihydroxy benzophenone, 2,4'-dihydroxy biphenyl, 1,7-dihydroxy naphthalene, 1,6-dihydroxy naphthalene, 1,5-dihydroxy naphthalene, 2,2'-dihydroxy benzophenone, 2,4'-dihydroxy benzophenone, 2,6-dihydroxy naphthalene, 2,7-dihydroxy naphthalene, 1,5-dihydroxy anthracene, 1,8-dihydroxy anthracene, 1,5-dihydroxy anthraquinone,

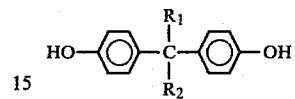

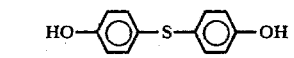

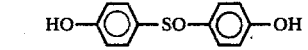

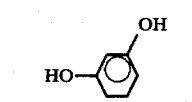

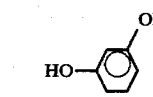

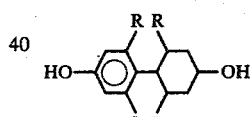

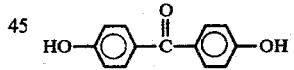

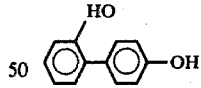

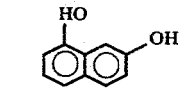

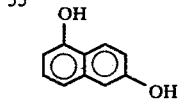

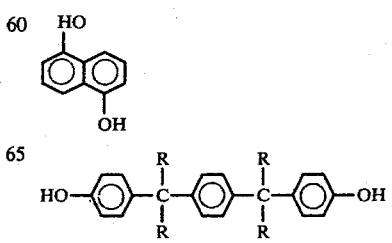

-continued

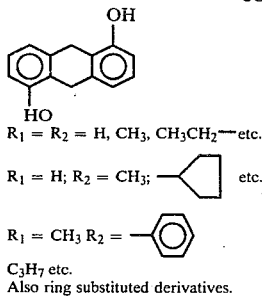

$R_1 = R_2 = H, CH_3, CH_3CH_2$— etc.

$R_1 = H; R_2 = CH_3;$ —△ etc.

$R_1 = CH_3$ $R_2 =$ —⬡

$C_3H_7$ etc.
Also ring substituted derivatives.

Suitable aromatic carboxylic acids include, among others, isophthalic acid, terephthalic acid, 2,6 and 2,7 naphthalene dicarboxylic acid, etc. Generally, any dicarboxylic acid can be utilized to prepare polyesters which has carboxyl groups directly attached to the same or different aromatic rings. The rings may have one or more substituents inert in the polymerization reaction. The catalysts useful in the polymerization include sodium hydroxide and sodium dithionite, potassium hydroxide and triphenylphosphite, lithium hydroxide, tri decyl phosphite, aluminum phosphate, sodium phosphate (mono basic), aluminum sulphate, boric anhydride, sodium phosphate (dibasic), sodium pyrophosphate, potassium phosphate, sodium borate, sodium borohydride, boric anhydride, dibutyltin oxide, zinc borate, calcium acetate, and combinations of the above such as lithium hydroxide plus tridecylphosphite, potassium hydroxide plus boric acid.

It has been discovered that polyesters prepared in any conventional manner disclosed herein or in the prior art can be color stabilized by the addition of mixtures of either phosphates or phosphonates with epoxide having a boiling point above 250° C. suitably having a boiling point in the range of 250° C. to 400° C. Usually the color stabilizers comprise about 0.005 to 5% by weight of the aromatic polyester, preferably 0.01 to 0.5%. Preferred phosphates include tributyltrithiophosphate and 2,6-di-t-butylphenyl phosphate and preferred phosphonates include 0,0-di-n-octadecyl-3,5-di-tert-butyl-4-hydroxy benzyl phosphonate.

Useful epoxides include all epoxides having a boiling point above 250° C. Particularly useful epoxides are 3,4-epoxycyclohexylmethyl-3,4-epoxy cyclohexane carboxylate, 3,4-epoxy 6-methyl cyclohexylmethyl-3,4-epoxyl-6-methylcyclohexane carboxylate, 4(3,4-epoxyl-6-methyl cyclohexylmethyl) butyl 3,4-epoxyl-6-methyl cyclohexane carboxylate, di-3,4-epoxyl-6-methyl cyclohexylmethyl adipate, bis-phenol-A diglycidyl ether, bis epoxycyclohexyl adipate, epoxidized edible oils, the preferred epoxy compound is di-3,4-epoxy-6-methylcyclohexyl adipate.

The color stabilization is suitably illustrated on a polymer prepared from bisphenol A and isophthaloyl chloride and terephthaloyl chloride. In this illustation suitably 68.4 parts by weight of bisphenol A are added to a solution of sodium hydroxide (25.2 parts by weight), deoxygenated water (14.50 parts by weight) together with sodium dithionite (0.2 parts by weight) and benzene triethyl ammonium chloride (0.3 parts by weight) in a suitable blender. To this are added terephthaloyl chloride (30.5 parts by weight) and isophthaloyl (30.6 parts by weight) in methylene chloride under medium speed stirring. After stirring for a short while, the polymer was precipitated by adding the solution to an excess of acetone and the solid precipitate was washed with acetone. One gram of the polymer was dissolved in methylene chloride (10 ml) and 0.05 ml of a 1% solution of 2,6-di-t-butylphenylphosphate and 0.05 ml of a 1% solution of a dicyclo diepoxy carboxylate was also added. A film was cast from the stabilized solution and heated to 200° C. for six days. The polyester polymer remained colorless and retained all of its physical properties. This demonstrates that the stabilized compositions are useful in inhibiting the color formation of polyester when exposed to oxygen at elevated temperatures and makes them useful as engineering plastics for automobile headlights and related application.

The following examples illustrate the preferred embodiment of this invention. It will be understood that these examples are for illustrative purposes only and do not purport to be wholly definitive with respect to the conditions or scope of the invention.

EXAMPLE 1

Bisphenol-A (68.4 g) was added to a solution of sodium hydroxide (25.2 g) in deoxygenated water (1450 ml) together with sodium dithionite (0.25 g) and benzenetriethylammonium chloride (0.3 g) in a 1-gallon Waring blender. To this was added a solution of terephthaloyl chloride (30.5 g) and isophthaloyl chloride (30.6 g) in methylene chloride (730 ml) under medium speed stirring. After five minutes stirring the polymer was precipitated by addition to an excess of acetone and the solid precipitate washed with acetone. The product was a white powder which was compression molded into a colorless, transparent button and exhibited an I.V. of 0.95.

EXAMPLE 2

A sample of the above polymer was placed in a glass vial and evacuated and purged with nitrogen several times to remove all traces of oxygen prior to sealing the vial. The polymer was then heated to 260° C. for twelve hours and remained clear, colorless, and transparent in contrast to a control sample which was open to the air and became a black, opaque mass. This would indicate that oxygen contributes to the color formation and degradation of polyaromatic esters.

EXAMPLE 3

A sample of the polymer prepared in Example 1 was dissolved in methylene chloride to give a 10 wt. % solution and a film was cast in a 4-inch petrie dish. When this film was heated to 200° C. in a forced-air oven for five days, it developed a dark amber color, became brittle, and was no longer soluble in dichloromethane indicating a three-dimensional network had formed.

EXAMPLE 4

One gram of the polymer prepared in Example 1 was dissolved in methylene chloride (10 ml) and 0.05 ml of a 1% solution of 2,6-di-t-butylphenyl phosphate and 0.05 ml of a 1% solution of MARK 135B, an epoxide of the following formula

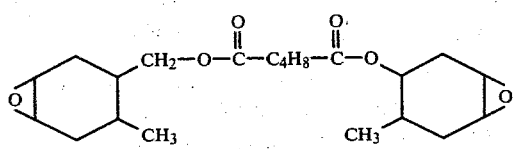

was also added. A film was cast from the stabilized solution and heated to 200° C. for six days. The polymer remained colorless and tough and flexible, and was fully soluble in methylene chloride and indeed showed no change in I.V.

EXAMPLE 5

One gram of the polymer prepared in Example 1 was dissolved in methylene chloride (10 ml) and 0.05 ml of a 1% solution of (Sandostab P-EPQ) (tetra kis [2,4 di-tert-butyl phenyl]4,4'-biphenylenediphosphonite) and 0.05 ml of a 1% solution of MARK 135B, the epoxide used in Example 4, was also added. A film was cast from the stabilized solution and heated to 200° C. for six days. The polymer developed little color, remained tough and flexible, and was fully soluble in methylene chloride and indeed showed no change in I.V.

EXAMPLE 6

One gram of the polymer prepared in Example 1 was dissolved in methylene chloride (10 ml) and 0.05 ml of a 1% solution of (Irganox 1093) o,o-di-n-octadecyl-3,5-di-tert-butyl-4 hydroxy benzyl phosphonate and 0.05 ml of a 1% solution of MARK 135B, the epoxide used in Example 4, as also added. A film was cast from the stabilized solution and heated to 200° C. for six days. The polymer developed little color, remained tough and flexible, and was fully soluble in methylene chloride and indeed showed no change in I.V.

TABLE 1

| Run No. | Reactants & Ratio | Polymerization Method | Catalyst, % |
|---|---|---|---|
| 1 | 0.9:1.0 IA:TA esters<br>2.0 bisphenol A<br>0.2 ethylene carbonate | Via phenyl-esters | 0.5 dibutyl tin maleate |
| 2 | 0.9:1.0 IA:TA esters<br>2.0 bisphenyl A<br>0.2 ethylene carbonate | Via phenyl-esters | 0.06 antimony trioxide |
| 3 | 0.9:1.0 IA:TA esters<br>2.0 bisphenol A<br>0.2 ethylene carbonate | Via phenyl-esters | 0.06 dibutyl tin oxide |
| 4 | 0.9:1.0 IA:TA esters<br>2.0 bisphenyl A<br>0.2 ethylene carbonate | Via phenyl-esters | 0.15 dibutyl tin diacetate (M&T 1-1 cat.) |
| 5 | 0.9:1.0 IA:TA esters<br>2.0 bisphenol A<br>0.2 ethylene carbonate | Via phenyl-esters | 0.15 stannus oxalate |
| 6 | 0.9:1.0 IA:TA esters<br>2.0 bisphenol A<br>0.2 ethylene carbonate | Via phenyl-esters | 0.25 phenyl boric acid |
| 7 | 0.9:1.0 IA:TA esters<br>2.0 bisphenol A<br>0.2 ethylene carbonate | Via phenyl-esters | 0.139 antimony tributoxide (M&T S-23A) |
| 8 | 0.1:1.0 IA:TA esters<br>2.0 bisphenol A<br>0.4 ethylene carbonate | Via phenyl-esters | 0.11 stannous oxalate |
| 9 | 0.9:1.0 IA:TA esters<br>2.0 bisphenol A<br>0.4 diphenol carbonate | Via phenyl-esters | 0.11 stannous oxalate |
| 10 | 0.9:1.0 IA:TA esters<br>2.0 bisphenol A<br>0.1 diphenyl carbonate | Via phenyl-esters | 0.03 antimony trioxide<br>0.073 stannous oxalate |
| 11 | 0.9:1.0 IA:TA esters<br>1.6 bisphenol A | Via phenyl-esters | 0.03 antimony trioxide |
| 12 | 0.4 hydroquinone<br>0.2 ethylene carbonate<br>0.9:1.0 IA:TA esters<br>2.0 bisphenol A<br>0.2 ethylene carbonate | Via phenyl-esters | 0.073 stannous oxalate<br>0.008 antimony trioxide<br>0.012 stannous oxalate |
| 13 | 1.0:1.0 IA:TA esters<br>2.02 Bisphenol-A | Via phenyl-esters | 0.001 lithium hydroxide<br>0.02 tridecyl phosphite |

| | | Reaction Conditions | | |
|---|---|---|---|---|
| No. | Total Metals (ppm) | Temp. ° C. | Time, hrs. | Inherent x Viscosity |
| 1 | 157 | 310 | 1.0 | 0.76 |
| 2 | 610 | 310 | 1.25 | 0.75 |
| 3 | 280 | 310 | 1.25 | 0.82 |
| 4 | 530 | 310 | 1.25 | i.s. |
| 5 | 1310° | 310 | 1.25 | 0.894 |
| 6 | — | 310 | 1.25 | 0.45 |
| 7 | 745 | 310 | 1.33 | 0.605 |
| 8 | 960 | 310 | 1.25 | 0.962 |
| 9 | 960 | 310 | 1.33 | 0.734 |
| 10 | 310<br>510 | 310 | 1.50 | 0.66 |
| 11 | 375<br>510 | 310 | 1.25 | 0.89 |
| 12 | 100<br>100 | 310 | 1.17 | 0.66 |
| 13 | 10 | 290 | 2.25 | 0.75 |

| No. | Tensile Strength PSI (ASTM D-638) | Elong. % (ASTM D-368) | Color |
|---|---|---|---|
| 1 | 4390 | 3.3 | Dark brown |
| 2 | 8590 | 7.4 | Pale yellow |
| 3 | 9675 | 11.0 | Light yellow |
| 4 | 7400 | 5.6 | Dark |
| 5 | 9595 | 8.7 | Light yellow |
| 6 | 5440 | 4.1 | Dark |
| 7 | 8260 | 5.2 | Yellow |
| 8 | 9095 | 11.4 | Yellow |
| 9 | 5835 | 4.7 | Dark yellow |
| 10 | 9365 | 8.7 | Yellow |
| 11 | 9855 | 19.7 | Yellow |
| 12 | 6628 | 4.9 | Orange Yellow |
| 13 | 9500 | 12.0 | Colourless |

IA = isophthalic acid
TA = terephthalic acid
The above melt polymerization catalysts are all known in the literature and give coloured products. To obtain a colourless polymer a catalyst consisting of lithium hydroxide (5–50 ppm) and a phoshpite (around 0.02 wt. %) is used and the preparation is carried out without the use of a carbonate.
The inherent viscosity is measured in a Cannon viscometer by running solutions containing 0.5 grams of polyester per 100 ml of dimethylacetamide at 25° C. The inherent viscosity is calculated from this data according to the procedures set forth on page 44 of Preparation Methods of Polymer Chemistry, Second Edition (1968), by W. R. Surenson and T. W. Campbell.

EXAMPLE 7

A mixture of diphenyl terephthalate (159 g), diphenyl isophthalate (159 g), bisphenol-A (230 g), potassium phosphate (0.1 g) in a 3 l resin kettle was evacuated to remove oxygen and kept under a blanket of nitrogen as the level of the vacuum was adjusted to 100 mm and the reactor immersed in an oil bath at 280° C. The solids melted, the reaction was stirred, and phenol distilled over. After 120 ml of phenol had been collected the vacuum was reduced to 50 mm. After 220 ml phenol had been collected the vacuum was reduced to 10 mm. When the polymer became noticeably viscous the vacuum was reduced to 1 mm and the polymer gently foamed. Stirring was stopped and the foaming polymer held under full vacuum for 20 minutes. The colourless polymer had an IV of 0.69. YTS, 10,000 psi; % elongation, 72%; H.D.T., 315° F.; T.I.S., 140.

I claim:

1. A color stable composition consisting essentially of aromatic polyester and a stabilizing quantity of a stabilizer selected from the group of mixtures of either organic phosphates or phosphonates with epoxides having a boiling point above 250° C. said stabilizer mixtures individually or in combination being about 0.01 to 0.5% by weight of the aromatic polyester.

2. The color stable composition of claim 1 wherein the polyester comprises a mixture of isophthalic acid and terephthalic acid moieties and moieties of an aromatic polyhydroxyl compound.

3. The color stable composition of claim 1 wherein the phosphate is 2,6-di-t-butyl phenyl phosphate.

4. The color stable composition of claim 1 wherein the polyester comprises a mixture of isophthalic acid and terephthalic acid moieties and bis-phenol A moieties.

5. The color stable composition of claim 4 wherein the phosphonate is O,O-di-n-octadecyl-3, 5-di-tert-butyl-4-hydroxy benzyl phosphonate.

6. The color stable composition of claim 4 wherein the phosphate is 2,6-di-t-butylphenyl phosphate.

7. The color stable composition of claim 1 wherein the stabilizer is 2,6-di-t-butylphenyl phosphate and

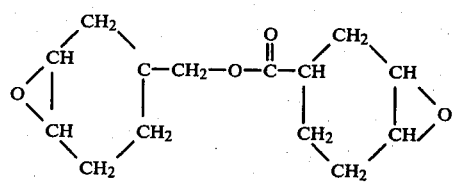

8. A color stable composition consisting essentially of aromatic polyester and a stabilizing quantity of a stabilizer selected from the group of mixtures of O,O-di-n-octadecyl-3, 5-di-tert-butyl-4-hydroxy benzyl phosphonate and epoxides having a boiling point above 250° C., said stabilizer mixtures individually or in a combination being about 0.01 to 0.5% by weight of the aromatic polyester.

9. A color stable composition consisting essentially of aromatic polyester and a stabilizing quantity of a stabilizer selected from the group of mixtures of O,O-di-n-octadeyl-3, 5-di-tert-butyl-4-hydroxy benzyl phosphonate and

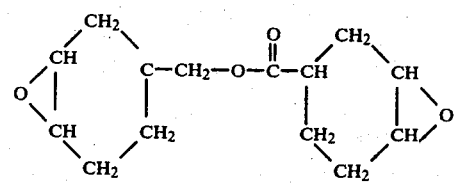

said stabilizer mixtures indivdually or in combination being about 0.01 to 0.5 percent by weight of the aromatic polyester.

10. A color stable composition consisting essentially of aromatic polyester and a stabilizing quantity of stabilizer selected from the group of mixtures of 2,6-di-t-butylphenyl phosphate and

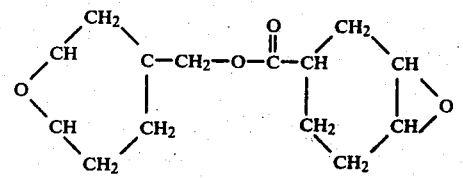

said stabilizer mixtures individually or in combination being about 0.01 to 0.5 percent by weight of the aromatic polyester.

* * * * *